US012585119B2

(12) United States Patent
Chao et al.

(10) Patent No.: US 12,585,119 B2
(45) Date of Patent: Mar. 24, 2026

(54) OPTICAL ELEMENT DRIVING MECHANISM

(71) Applicant: TDK TAIWAN CORP., Taoyuan City (TW)

(72) Inventors: Chen-Hung Chao, Taoyuan City (TW); Po-Xiang Zhuang, Taoyuan City (TW); Yi-Ho Chen, Taoyuan City (TW); Shou-Jen Liu, Taoyuan City (TW); Sin-Jhong Song, Taoyuan City (TW); Cheng-Jui Chang, Taoyuan City (TW)

(73) Assignee: TDK TAIWAN CORP., Taoyuan City (TW)

( * ) Notice: Subject to any disclaimer, the term of this patent is extended or adjusted under 35 U.S.C. 154(b) by 249 days.

(21) Appl. No.: 18/351,698

(22) Filed: Jul. 13, 2023

(65) Prior Publication Data
US 2024/0019760 A1    Jan. 18, 2024

Related U.S. Application Data

(60) Provisional application No. 63/388,793, filed on Jul. 13, 2022.

(51) Int. Cl.
| | |
|---|---|
| *G02B 7/02* | (2021.01) |
| *G02B 27/01* | (2006.01) |
| *G03B 5/00* | (2021.01) |
| *G03B 17/12* | (2021.01) |
| *H02K 41/035* | (2006.01) |

(52) U.S. Cl.
CPC .......... *G02B 27/0172* (2013.01); *G02B 7/02* (2013.01); *G02B 27/01* (2013.01); *G02B 27/0176* (2013.01); *G03B 5/00* (2013.01); *G03B 17/12* (2013.01); *H02K 41/0354* (2013.01); *G02B 2027/0159* (2013.01); *G03B 2205/0069* (2013.01)

(58) Field of Classification Search
CPC .......... G03B 9/06; G03B 30/00; H04N 23/57; H04N 23/55
See application file for complete search history.

(56) References Cited

U.S. PATENT DOCUMENTS

| | | | | |
|---|---|---|---|---|
| 8,670,067 B2 * | 3/2014 | Naito | ...................... | H04N 23/54 |
| | | | | 348/333.12 |
| 11,199,757 B2 * | 12/2021 | Nakamura | ............. | G03B 17/08 |
| 2020/0285132 A1 * | 9/2020 | Chen | ........................ | G03B 13/36 |
| 2022/0382128 A1 * | 12/2022 | Lee | ........................... | G03B 9/02 |
| 2024/0061317 A1 * | 2/2024 | You | ........................... | G03B 3/10 |

FOREIGN PATENT DOCUMENTS

| | | | | | |
|---|---|---|---|---|---|
| KR | 2011103525 A | * | 9/2011 | | |
| KR | 2015051683 A | * | 5/2015 | ............. | G02B 5/208 |

* cited by examiner

*Primary Examiner* — Leon W Rhodes, Jr.
(74) *Attorney, Agent, or Firm* — MUNCY, GEISSLER, OLDS & LOWE, P.C.

(57) ABSTRACT

An optical element driving mechanism is provided, including a movable part, a fixed part, and a driving assembly. The movable part is connected to an optical element. The movable part is movable relative to the fixed part. The driving assembly drives the movable part to move relative to the fixed par. The fixed part includes an outer frame and a base.

18 Claims, 8 Drawing Sheets

1

100

OPTICAL ELEMENT DRIVING MECHANISM

CROSS REFERENCE TO RELATED APPLICATIONS

This application claims the benefit of U.S. Provisional Application No. 63/388,793, filed Jul. 13, 2022, the entirety of which is incorporated by reference herein.

BACKGROUND OF THE INVENTION

Field of the Invention

The present disclosure relates to an optical element driving mechanism, and more particularly, the present disclosure relates to an optical element driving mechanism for an electronic device.

Description of the Related Art

As the relevant technologies have been developed, many electronic devices (such as computers and tablets) are equipped with the capability to record images and videos. However, when an optical element (such as lens) having a long focal length is provided in an electronic device, the thickness of the electronic device may be increased, impeding the prospects for miniaturization of the electronic device. Therefore, how to design an optical element driving mechanism and an optical device that may miniaturize the electronic device has become an important issue.

BRIEF SUMMARY OF THE INVENTION

To solve the problems of the prior art, an optical element driving mechanism is provided, including a movable part, a fixed part, and a driving assembly. The movable part is connected to an optical element. The movable part is movable relative to the fixed part. The driving assembly drives the movable part to move relative to the fixed par. The fixed part includes an outer frame and a base.

In one of the embodiments of the present disclosure, the optical element driving mechanism further includes a connecting element. The connecting element includes a first connecting element, a second connecting element, and an intermediate connecting element. The first connecting element includes a first connecting element first surface. The second connecting element includes a second connecting element first surface, facing the first connecting element first surface. The intermediate connecting element is disposed between the first connecting element first surface and the second connecting element first surface. The first connecting element first surface is not in contact with the second connecting element first surface. The outer frame is fixedly connected to the base via the connecting assembly. The first connecting element and the base have an integrally formed structure. The second connecting element and the outer frame have an integrally formed structure. The outer frame is made of plastic material.

In one of the embodiments of the present disclosure, the first connecting element further includes a first connecting element second surface, the first connecting element second surface is not parallel to the first connecting element first surface. The second connecting element further includes a second connecting element second surface, the second connecting element second surface is not parallel to the second connecting element first surface, and the second connecting element second surface faces the first connecting element second surface. The intermediate connecting element is disposed between the first connecting element second surface and the second connecting element second surface. The base includes an connection reinforcing element, the connection reinforcing element is disposed on the first connecting element second surface and corresponds to the intermediate connecting element. The connection reinforcing element has a plurality of grooves.

In one of the embodiments of the present disclosure, the first connecting element further includes a first connecting element third surface, the first connecting element third surface is not parallel to the first connecting element second surface. The second connecting element further includes a second connecting element third surface, the second connecting element third surface is not parallel to the second connecting element second surface, and the second connecting element third surface faces the first connecting element third surface. A distance between the first connecting element third surface and the second connecting element third surface is smaller than a distance between the first connecting element first surface and the second connecting element first surface. The distance between the first connecting element third surface and the second connecting element third surface is smaller than a distance between the first connecting element second surface and the second connecting element second surface. The distance between the first connecting element first surface and the second connecting element first surface is larger than the distance between the first connecting element second surface and the second connecting element second surface.

In one of the embodiments of the present disclosure, the first connecting element further includes a first connecting element fourth surface, the first connecting element fourth surface is not parallel to the first connecting element third surface. The second connecting element further includes a second connecting element fourth surface, the second connecting element fourth surface is not parallel to the second connecting element third surface, and the second connecting element fourth surface faces the first connecting element fourth surface. A distance between the first connecting element fourth surface and the second connecting element fourth surface is smaller than the distance between the first connecting element first surface and the second connecting element first surface. The distance between the first connecting element fourth surface and the second connecting element fourth surface is smaller than the distance between the first connecting element second surface and the second connecting element second surface.

In one of the embodiments of the present disclosure, the optical element driving mechanism, further including a light shielding assembly, including a first light shielding element, a second light shielding element. The first light shielding element includes a first light shielding element opening, wherein the first light shielding element opening corresponds to a light. The second light shielding element includes a second light shielding element opening, wherein the second light shielding element opening corresponds to the light, and the second light shielding element opening is smaller than the first light shielding element opening. The first light shielding element opening is closer to a light incident end than the second light shielding element opening.

In one of the embodiments of the present disclosure, the first light shielding element is disposed on the outer frame, and the second light shielding element is disposed on the base. A first adhesive element is disposed between the first light shielding element and the outer frame. A second adhesive element is disposed between the second light shielding element and the base. The Young's modulus of the first adhesive element is smaller than the Young's modulus of the second adhesive element.

In one of the embodiments of the present disclosure, the movable part includes an movable part main body, and a movable part protrusion. The movable part protrusion extends from the movable part main body towards the first light shielding element. The movable part protrusion pass through the optical element. The movable part protrusion at least partially overlaps the outer frame when viewed along a direction that is perpendicular to an optical axis. The movable part protrusion is not in contact with the outer frame.

In one of the embodiments of the present disclosure, the second light shielding element at least partially overlaps with the movable part main body when viewed along the direction that is perpendicular to the optical axis.

In one of the embodiments of the present disclosure, the optical element includes an optical element first opening, and the movable part protrusion passes through the optical element first opening.

In one of the embodiments of the present disclosure, the base includes a base main body, and a base protrusion. The base protrusion extends from the base main body towards the first light shielding element. The base protrusion passes through the second light shielding element and the optical element. The base protrusion at least partially overlaps the outer frame when viewed along a direction that is perpendicular to an optical axis. The base protrusion is not in contact with the outer frame.

In one of the embodiments of the present disclosure, the optical element further includes an optical element second opening, and the base protrusion passes through the optical element second opening. The optical element first opening is larger than the optical element second opening. The outer frame includes an outer frame opening, and the movable part protrusion and the base protrusion extend into the outer frame opening.

In one of the embodiments of the present disclosure, there is a gap between the second light shielding element and the optical element.

In one of the embodiments of the present disclosure, the outer frame has an outer frame cutting edge, and the first light shielding element has a first light shielding element cutting edge. The first light shielding element cutting edge is aligned with the outer frame cutting edge when viewed along an optical axis.

In one of the embodiments of the present disclosure, the base includes a base first bottom wall, a base second bottom wall, a base first side wall, and a base second side wall. The base first side wall is connected to the base first bottom wall and extending away from the base first bottom wall. The base second side wall faces the base first side wall, connected to the base second bottom wall, and extending away from the base second bottom wall. The base first side wall and the base second side wall are not parallel to each other.

In one of the embodiments of the present disclosure, the base first bottom wall is not perpendicular to the base first side wall, and the base second bottom wall is not perpendicular to the base second side wall. The base first bottom wall and the base second bottom wall are not parallel to an optical axis.

In one of the embodiments of the present disclosure, the angle between the base first bottom wall and the base first side wall is greater than 90 degrees, and the angle between the base second bottom wall and the base second side wall is greater than 90 degrees.

In one of the embodiments of the present disclosure, the optical element driving mechanism further includes a stopping assembly, including a base first stopping element, a base first stopping element, and a movable part first stopping element. The movable part first stopping element faces the base first stopping element. The movable part first stopping element is contactable with the base first stopping element to limit a distance that the movable part moves close to or away from the center of the optical element driving mechanism.

In one of the embodiments of the present disclosure, the stopping assembly further includes a base second stopping element, and a movable part second stopping element. The movable part second stopping element faces the base second stopping element. The movable part second stopping element is contactable with the base second stopping element, so as to limit the distance that the movable part moves close to or away from the center of the optical element driving mechanism.

In one of the embodiments of the present disclosure, the base includes a base third bottom wall, and a movable part supporting foot. The base third bottom wall faces the movable part. The movable part includes an movable part main body, and a movable part supporting foot. The movable part supporting foot extends from the movable part main body toward the base third bottom wall. The movable part supporting foot abuts against the base third bottom wall.

BRIEF DESCRIPTION OF THE DRAWINGS

The present invention may be more fully understood by reading the subsequent detailed description and examples with references made to the accompanying drawings, wherein.

DETAILED DESCRIPTION OF THE INVENTION

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

It should be noted that the technical solutions provided by different embodiments below may be interchangeable, combined or mixed to form another embodiment without departing from the spirit of the present disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The scale of the drawings in the present disclosure may be drawn according to the actual size. The scale of the same figure in the present disclosure can be used as the actual manufacturing scale of the devices, equipment, elements, etc. of the present disclosure. It should be noted that each figure may be drawn at different orientations, which may result in different size ratios among different figures. However, the size ratio shown in an individual figure is not affect by the different size ratios between different figures. People with ordinary skill in the art can understand that the size ratio of the figures in the present disclosure can be used as a distinguishing feature from the prior art.

Figure 1:
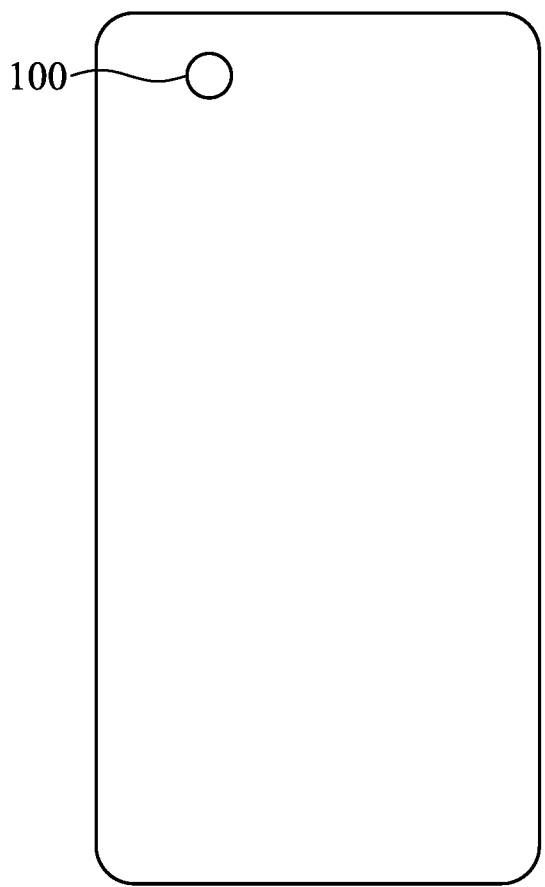
FIG. 1 is a schematic view of an electrical device according to some embodiment of the present disclosure.

Firstly, please refer to FIG. 1, FIG. 1 is a schematic view of an electrical device 1 according to some embodiment of the present disclosure. As shown in FIG. 1, an optical element driving mechanism 100 of some embodiment of the present disclosure may be mounted in an electrical device 1 for taking photos or videos, wherein the aforementioned electrical device 1 may, for example, be a smartphone or a digital camera, but the present disclosure is not limited to these. It should be noted that the position and the size between the optical element driving mechanism 100 and the electrical device 1 shown in FIG. 1 are only an example, which is not for limiting the position and the size between the optical element driving mechanism 100 and the electrical device 1. In fact, according to different needs, the optical element driving mechanism 100 may be mounted at different positions in the electrical device 1

Figure 2:
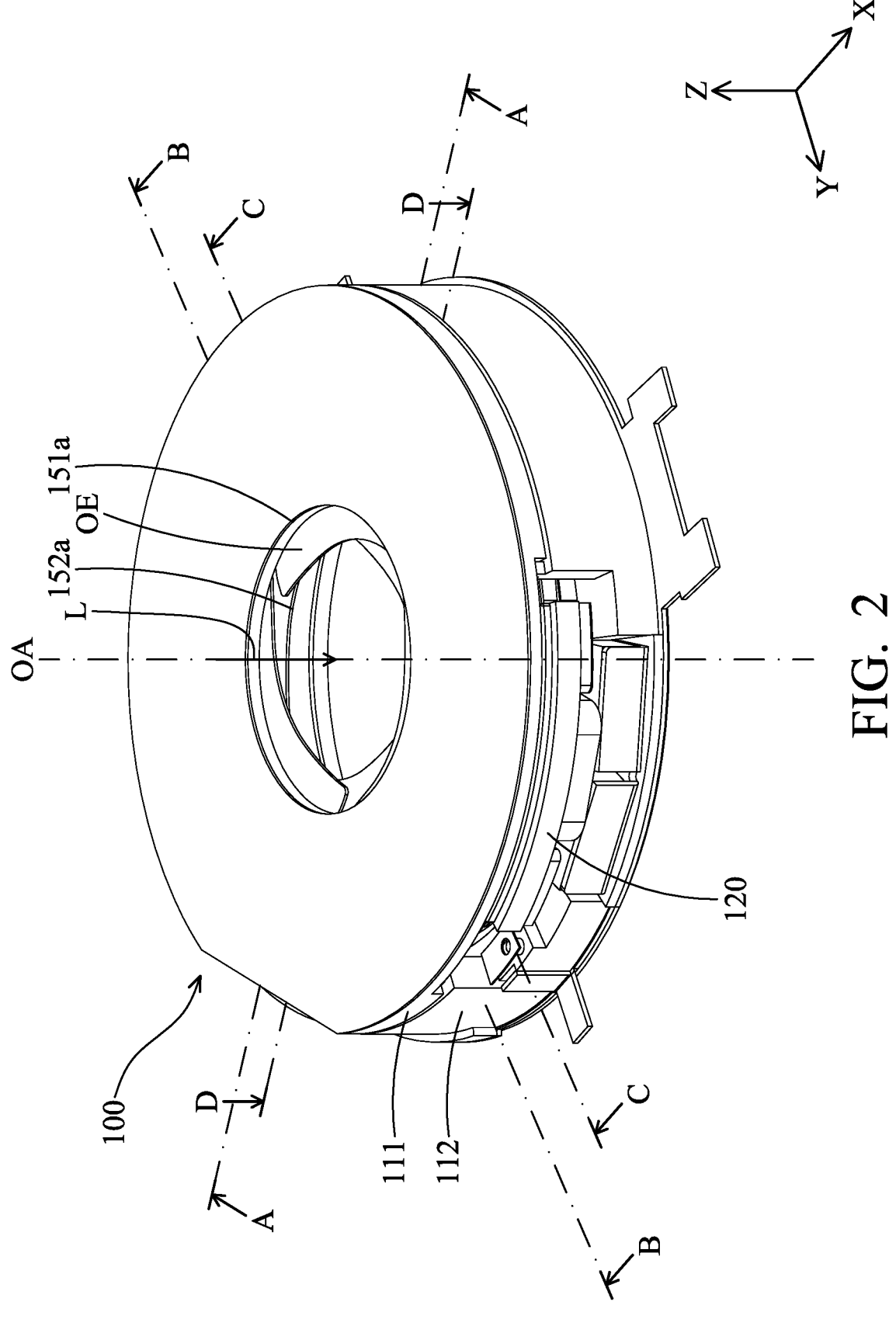
FIG. 2 is a schematic view of an optical element driving mechanism and an optical element according to some embodiments of the present disclosure.
Figure 3:
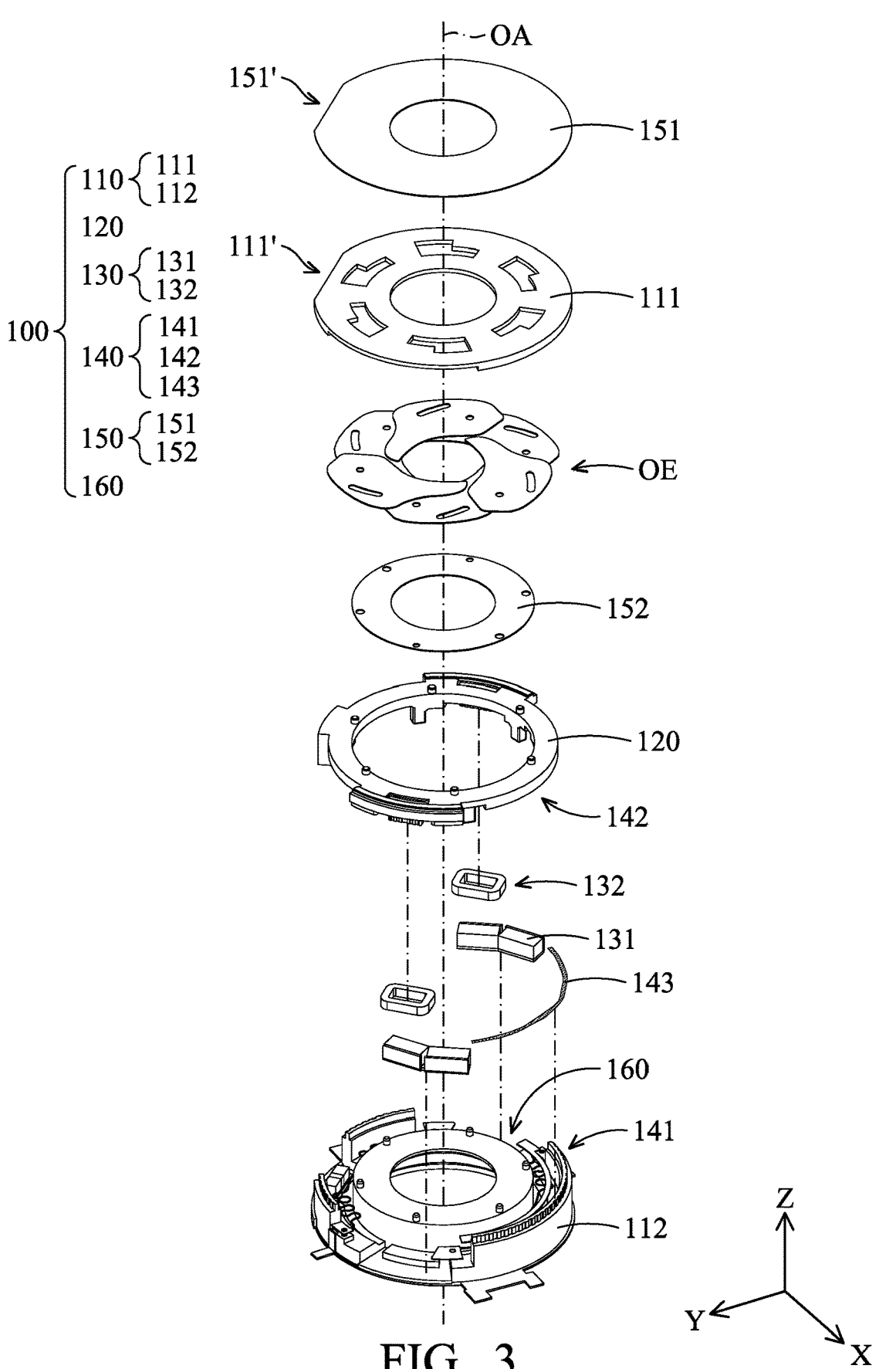
FIG. 3 is an exploded view of the optical element driving mechanism and the optical element according to some embodiments of the present disclosure.

Please refer to FIG. 2 and FIG. 3. FIG. 2 is a schematic view of an optical element driving mechanism 100 and an optical element OE according to some embodiments of the present disclosure. FIG. 3 is an exploded view of the optical element driving mechanism 100 and the optical element OE according to some embodiments of the present disclosure.

The optical element driving mechanism 100 may include a fixed part 110, a movable part 120, a driving assembly 130, a connecting assembly 140, a light shielding assembly 150, and a stopping assembly 160.

The fixed part 110 may include an outer frame 111 and a base 112. The outer frame 111 and the base 112 may be connected to each other to accommodate other elements of the optical element driving mechanism 100 or the optical element OE.

According to some embodiments of the present disclosure, the outer frame 111 may have a substantially circular shape when viewed along an optical axis OA. However, the outer frame 111 may have an outer frame cutting edge 111' such that the outer frame 111 is not a complete circle. For example, the outer frame cutting edge 111' may be a chord of the circle of the outer frame 111.

The movable part 120 may be connected to the optical element OE, and the movable part 120 may move relative to the fixed part 110. For example, the movable part 120 may move around the optical axis OA relative to the fixed part 110, and the optical element OE may move around the optical axis OA along with the movable part 120 relative to the fixed part 110.

According to some embodiments of the present disclosure, the optical axis OA may be the main direction of the light L entering the optical element driving mechanism 100. Also, for example, the optical axis OA may be parallel to the Z axis. According to some embodiments of the present disclosure, the optical axis OA may pass through a center 100C of the optical element driving mechanism 100.

The driving assembly 130 may drive the movable part 120 to move relative to the fixed part 110. The driving assembly 130 may include a driving magnet 131 and a driving coil 132.

According to some embodiments of the present disclosure, the driving magnet 131 may be disposed on the base 112 of the fixed part 110, and the driving coil 132 may be disposed on the movable part 120 to drive the movable part 120 to move relative to the fixed part 110.

However, according to some other embodiments of the present disclosure, the driving magnet 131 may be disposed on the movable part 120, and the driving coil 132 may be disposed on the fixed part 110 to drive the movable part 120 to move relative to the fixed part 110.

The light shielding assembly 150 may shield undesired light, so as to prevent the undesired light from entering the optical lens (not shown). The light shielding assembly 150 may include a first light shielding element 151 and a second light shielding element 152.

According to some embodiments of the present disclosure, the first light shielding element 151 may have a substantially circular shape when viewed along the optical axis OA. However, the first light shielding element 151 may have a first light shielding element cutting edge 151' so that the first light shielding element 151 is not a complete circle. For example, the first light shielding element cutting edge 151' may be a chord the circle of the first light shielding element 151.

According to some embodiments of the present disclosure, the first light shielding element cutting edge 151' of the first light shielding element 151 may correspond to the outer frame cutting edge 111' of the outer frame 111. For example, the first light shielding element cutting edge 151' of the first light shielding element 151 may be aligned with the outer frame cutting edge 111' of the outer frame 111 when viewed along the optical axis OA.

In this way, the manufacture of the optical element driving mechanism 100 and the optical element OE may be simplified, and the effect of cost reduction may be achieved.

Figure 4:
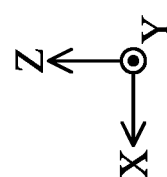
FIG. 4 is a cross-sectional view of the optical element driving mechanism and the optical element along line A-A' of FIG. 2 according to some embodiments of the present disclosure.
Figure 4:
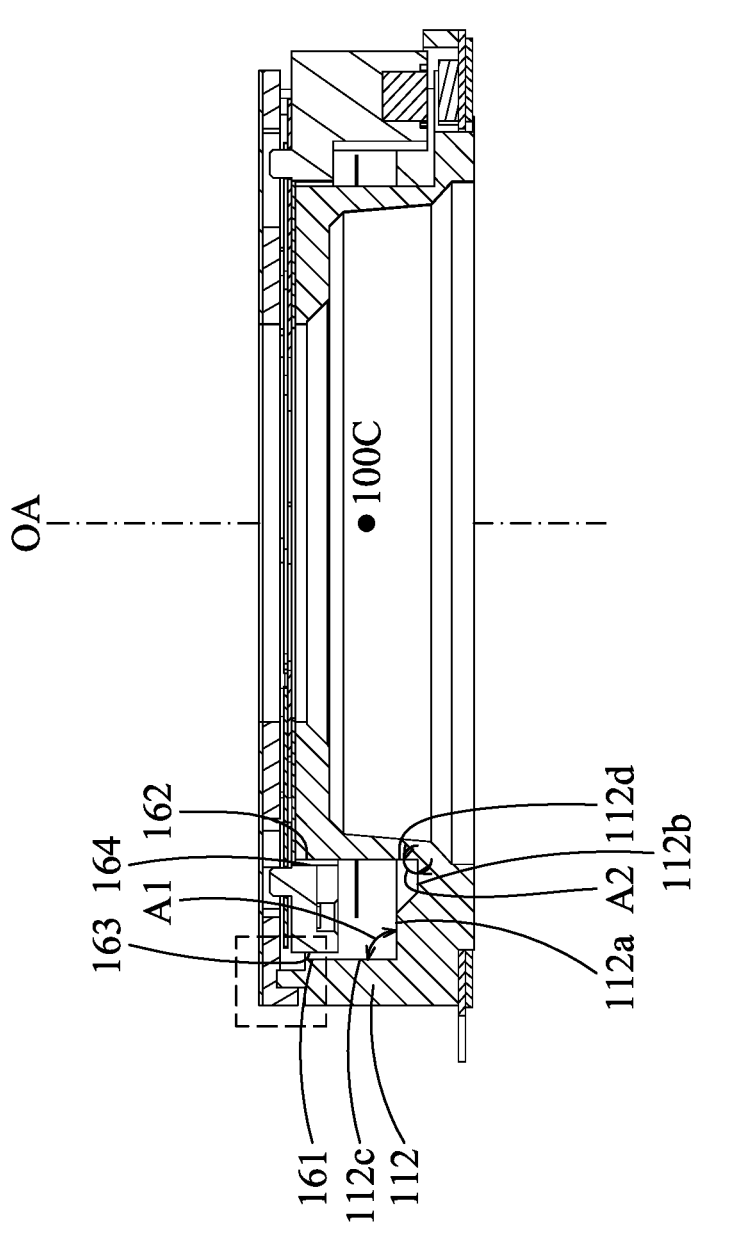

Please refer to FIG. 4, FIG. 4 is a cross-sectional view of the optical element driving mechanism 100 and the optical element OE along line A-A' of FIG. 2 according to some embodiments of the present disclosure.

As shown in FIG. 4, the base 112 may include a base first bottom wall 112a, a base second bottom wall 112b, a base first side wall 112c, and a base second side wall 112d.

According to some embodiments of the present disclosure, the base first bottom wall 112a and the base second bottom wall 112b may be located at different heights. For example, the position of the base second bottom wall 112b may be lower than the position of the base first bottom wall 112a, so that the optical element driving mechanism 100 may have more internal space to accommodate other elements of the optical element driving mechanism 100, and then the miniaturization effect may be achieved.

According to some embodiments of the present disclosure, the base first side wall 112c may be connected to the base first bottom wall 112a, and the base first side wall 112c may extend away from the base first bottom wall 112a.

According to some embodiments of the present disclosure, the base second side wall 112d may be connected to the base second bottom wall 112b, and the base second side wall 112d may extend away from the base second bottom wall 112b.

According to some embodiments of the present disclosure, the base first sidewall 112c and the base second sidewall 112d may face each other, and the base first sidewall 112c and the base second sidewall 112d may not be parallel to each other.

According to some embodiments of the present disclosure, the base first bottom wall 112a and the base second bottom wall 112b may be parallel to each other or substantially parallel to each other, and the base first bottom wall 112a and the base second bottom wall 112b may be perpendicular to or substantially perpendicular to the optical axis OA.

According to some embodiments of the present disclosure, the base first sidewall 112c and the base second sidewall 112d may not be parallel to the optical axis OA.

According to some embodiments of the present disclosure, the base first side wall 112c may not be perpendicular to the base first bottom wall 112a of the. And, the base second side wall 112d may not be perpendicular to the base second bottom wall 112b.

According to some embodiments of the present disclosure, there may be an included angle A1 between the base first side wall 112c and the base first bottom wall 112a, and the included angle A1 may not be 90 degrees. For example, the included angle A1 may be larger than 90 degrees or slightly larger than 90 degrees.

According to some embodiments of the present disclosure, there may be an included angle A2 between the base second side wall 112d and the base second bottom wall 112b, and the included angle A2 may not be 90 degrees. For example, the included angle A2 may be larger than 90 degrees or slightly larger than 90 degrees.

However, according to some other embodiments of the present disclosure, the included angle A1 and/or the included angle A2 may also be 90 degrees, smaller than 90 degrees or slightly smaller than 90 degrees.

In this way, the manufacture of the optical element driving mechanism 100 and the optical element OE may be simplified, and the effect of cost reduction may be achieved.

Please continue to refer to FIG. 4, the stopping assembly 160 may include a base first stopping element 161, a base second stopping element 162, a movable part first stopping element 163, and a movable part second stopping element 164.

According to some embodiments of the present disclosure, the base first stopping element 161 and the movable part first stopping element 163 may face each other each other, and the base first stopping element 161 and the movable part first stopping element 163 may be parallel to each other or substantially parallel to each other.

There may be a gap between the base first stopping element 161 and the movable part first stopping element 163, so that the movable part first stopping element 163 may move close to or away from the base first stopping element 161.

Moreover, the movable part first stopping element 163 may be in contact with the base first stopping element 161 to limit a distance (not shown) that the movable part 120 moves close to or away from a center 100C of the optical element driving mechanism 100.

According to some embodiments of the present disclosure, the base second stopping element 162 and the movable part second stopping element 164 may face each other, and the base second stopping element 162 and the movable part second stopping element 164 may be parallel to each other or substantially parallel to each other.

There may be a gap between the base second stopping element 162 and the movable part second stopping element 164, so that the movable part second stopping element 164 may move close to or away from the base second stopping element 162.

Moreover, the movable part second stopping element 164 may be in contact with the base second stopping element 162 to limit a distance (not shown) that the movable part 120 moves close to or away from the center 100C of the optical element driving mechanism 100.

In this way, the movement of the movable part 120 may be effectively controlled, so that the optical element driving mechanism 100 and the optical element OE are more stable.

According to some embodiments of the present disclosure, the first base sidewall 112c and the first base stopping element 161 may be integrally formed, and the base second sidewall 112d and the base second stopping element 162 may be integrally formed.

According to some embodiments of the present disclosure, the base first stopping element 161 may be an upper portion of the base first side wall 112c, and the base second stopping element 162 may be an upper portion of the base second side wall 112d.

In this way, the structure of the optical element driving mechanism 100 may be more stable, and the effect of miniaturization may be achieved.

Figure 5:
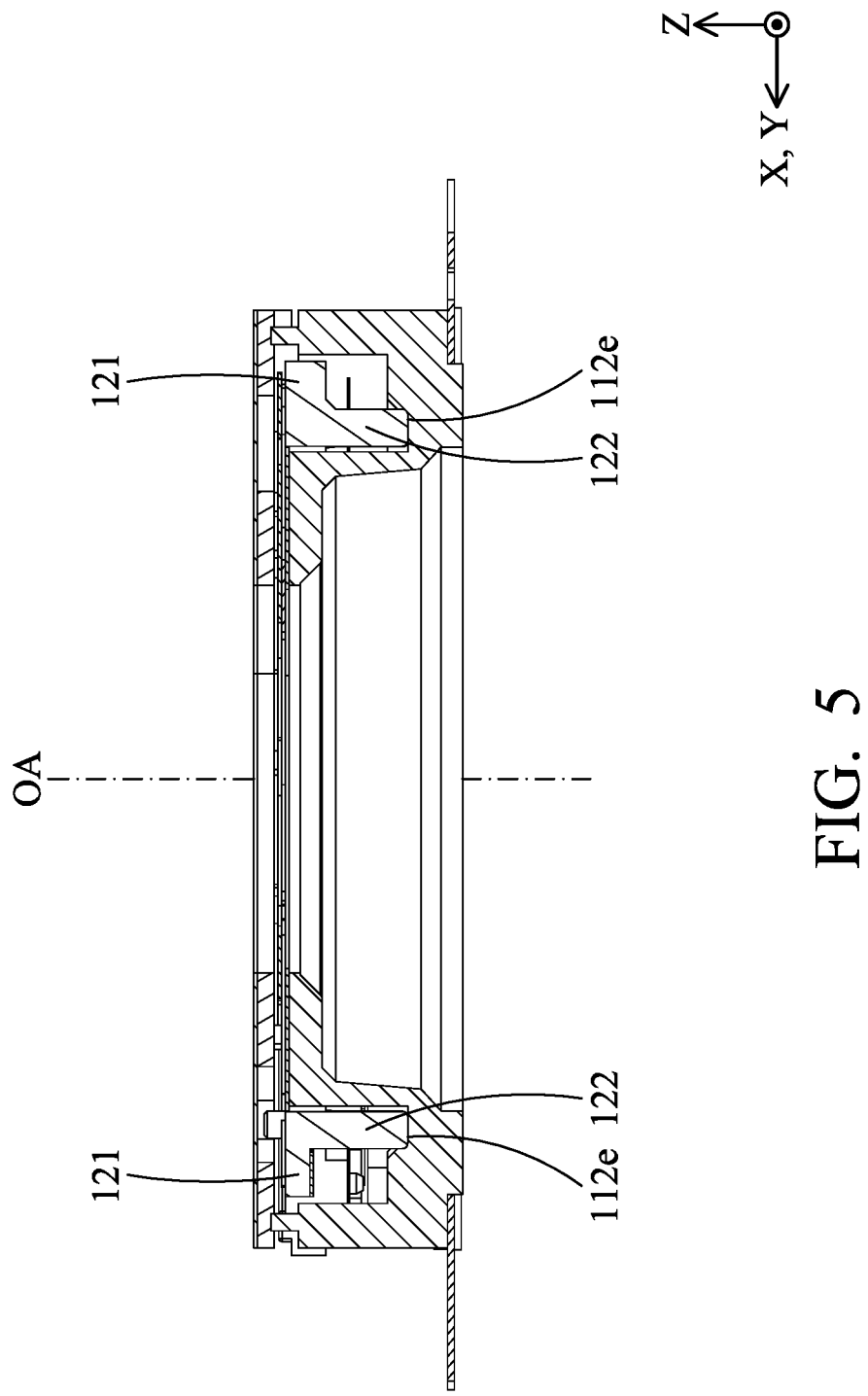
FIG. 5 is a cross-sectional view of the optical element driving mechanism and the optical element along the line B-B' in FIG. 2 according to some embodiments of the present disclosure.

Please refer to FIG. 5, FIG. 5 is a cross-sectional view of the optical element driving mechanism 100 and the optical element OE along the line B-B' in FIG. 2 according to some embodiments of the present disclosure.

As shown in FIG. 5, the base 112 may further include a base third bottom wall 112e. The base third bottom wall 112e may face the movable part 120, and the base third bottom wall 112e may be perpendicular or substantially perpendicular to the optical axis OA.

Please continue to refer to FIG. 5, the movable part 120 may include a movable part main body 121 and a movable part supporting foot 122.

The movable part supporting foot 122 may extend from the movable part main body 121 toward the base third bottom wall 112*e*, and the movable part supporting foot 122 may abut against the third bottom wall 112*e* of the base.

According to some embodiments of the present disclosure, the movable part 120 may include a plurality of movable part supporting feet 122 to stably support the movable part main body 121.

In this way, the structure of the movable part 120 may be simplified, making the manufacturing of the optical element driving mechanism 100 and the optical element OE more stable and easier, thereby achieving the effect of reducing costs.

Figure 6:
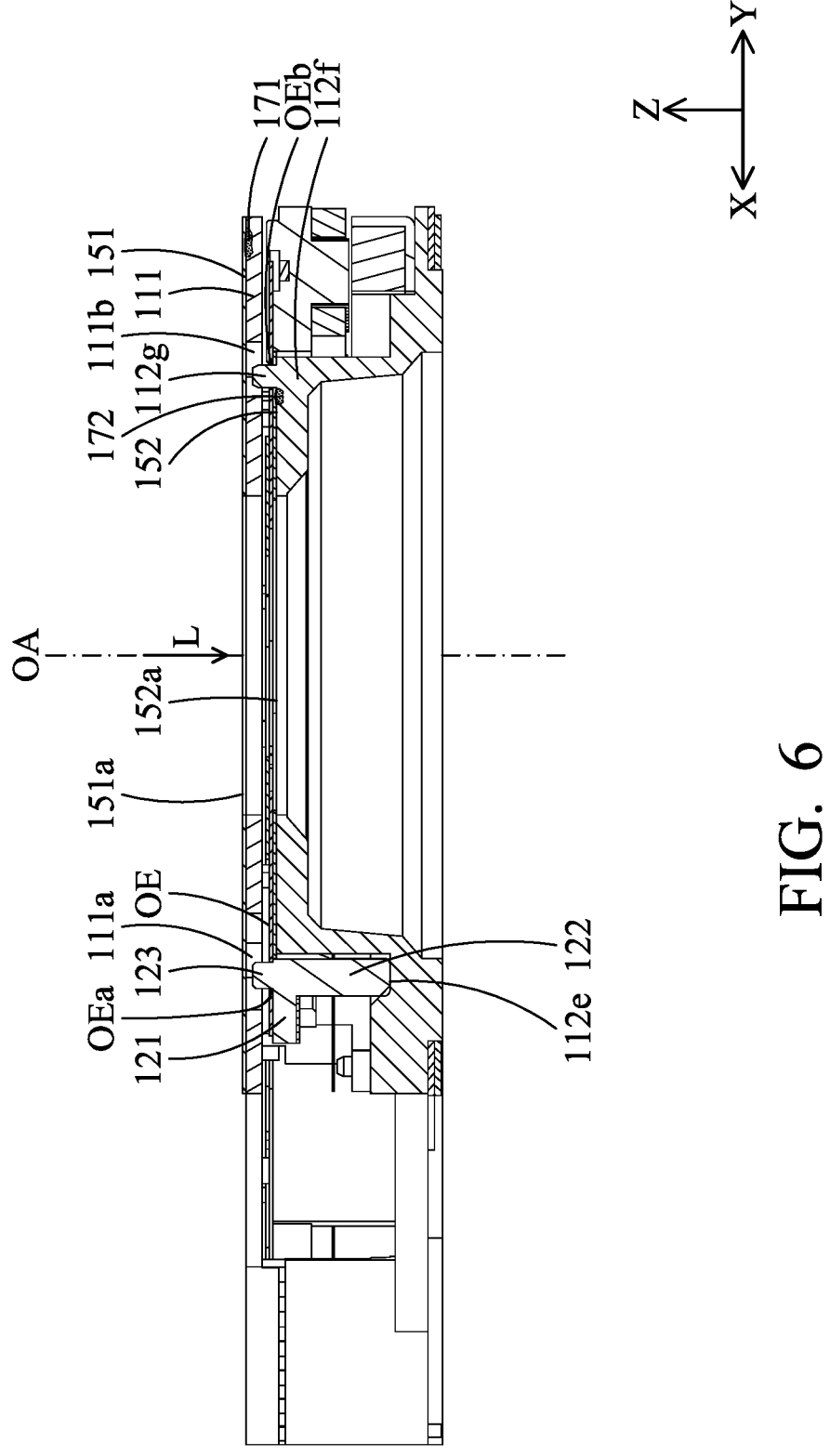
FIG. 6 is a cross-sectional view of the optical element driving mechanism and the optical element along line C-C' in FIG. 2, according to some embodiments of the present disclosure.

Please refer to FIG. 6, FIG. 6 is a cross-sectional view of the optical element driving mechanism 100 and the optical element OE along line C-C' in FIG. 2, according to some embodiments of the present disclosure.

As shown in FIG. 6, the first light shielding element 151 may be disposed on the outer frame 111, and a first adhesive element 171 may be disposed between the first light shielding element 151 and the outer frame 111 to fix the first light shielding element 151 to the outer frame 111.

According to some embodiments of the present disclosure, the first adhesive element 171 may have a thickness of about 0.1 mm. For example, the first adhesive element 171 may be double-sided tape or other suitable adhesive materials.

The second light shielding element 152 may be disposed on the base 112, and a second adhesive element 172 may be disposed between the second light shielding element 152 and the base 112 to fix the second light shielding element 152 to the base 112.

According to some embodiments of the present disclosure, the second light shielding element 152 may at least partially overlap the movable part main body 121 when viewed along a direction that is perpendicular to the optical axis OA.

According to some embodiments of the present disclosure, there may be a gap between the second light shielding element 152 and the optical element OE, so as to prevent the second light shielding element 152 from obstructing the movement of the optical element OE relative to the fixed part 110.

In this way, the optical element driving mechanism 100 and the optical element OE may be more stable.

According to some embodiments of the present disclosure, the second adhesive element 172 may have a thickness of about 0.1 mm. For example, the second adhesive element 172 may be thermosetting glue or other suitable adhesive materials.

According to some embodiments of the present disclosure, the Young's modulus of the first adhesive element 171 may be smaller than the Young's modulus of the second adhesive element 172. That is to say, the first adhesive element 171 may be softer and more elastic than the second adhesive element 172. In this way, external shocks may be effectively absorbed.

According to some embodiments of the present disclosure, the first light shielding element 151 may have a thickness of about 30 microns to about 60 microns. According to some embodiments of the present disclosure, the first light shielding element 151 may have a thickness of about 30 microns. According to some embodiments of the present disclosure, the first light shielding element 151 may have a thickness of about 60 microns.

In this way, the optical element driving mechanism 100 and the optical element OE may be more stable.

Please continue to refer to FIG. 6, the first light shielding element 151 may include a first light shielding element opening 151*a*. The first light shielding element opening 151*a* may correspond to a light L to allow the light L to enter the optical element driving mechanism 100.

The second light shielding element 152 may include a second light shielding element opening 152*a*. The second light shielding element opening 152*a* may correspond to the light L to allow the light L to enter the optical lens (not shown).

According to some embodiments of the present disclosure, the first light shielding element opening 151*a* may be closer to a light incident end 100*a* of the optical element driving mechanism 100 than the second light shielding element opening 152*a*. Moreover, the opening 152*a* of the second light shielding element may be smaller than the opening 151*a* of the first light shielding element, so as to control the intensity of the light L entering the optical lens (not shown).

In this way, the incoming light may be effectively controlled, thereby making the optical element driving mechanism 100 and the optical element OE more stable.

Please continue to refer to FIG. 6, the outer frame 111 may include an outer frame first opening 111*a* and an outer frame second opening 111*b*; the optical element OE may include an optical element first opening OEa and an optical element second opening OEb; and, the movable part 120 may further include a movable part protrusion 123.

The movable part protrusion 123 may extend from the movable part main body 121 toward the first light shielding element, and the movable part protrusion 123 may pass through the optical element first opening OEa of the optical element OE, and the movable part protrusion 123 may extend into the outer frame first opening 111*a*.

Therefore, when viewed along a direction that is perpendicular to the optical axis OA, the movable part protrusion 123 and the optical element OE may at least partially overlap, and the movable part protrusion 123 may be in contact with the optical element OE.

Therefore, when viewed along a direction that is perpendicular to the optical axis OA, the movable part protrusion 123 may at least partially overlap the outer frame 111, but the movable part protrusion 123 may not be in contact with the outer frame 111.

In this way, the optical element OE may be effectively controlled, thereby making the optical element driving mechanism 100 and the optical element OE more stable.

Please continue to refer to FIG. 6, the base 112 may further include a base main body 112*f* and a base protrusion 112*g*. The base protrusion 112*g* may extend from the base main body 112*f* toward the first light shielding element 151. And, the base protrusion 112*g* may pass through the second light shielding element 152 and the second optical element opening OEb of the optical element OE, and the base protrusion 112*g* may extend into the outer frame second opening 111*b*.

Therefore, when viewed along a direction that is perpendicular to the optical axis OA, the base protrusion 112*g* and the optical element OE may at least partially overlap, and the base protrusion 112*g* may be in contact with the optical element OE.

When viewed along a direction that is perpendicular to the optical axis OA, the base protrusion 112*g* and the outer frame 111 may at least partially overlap, but the base main body 112*f* may not be in contact with the outer frame 111.

In this way, the optical element OE may be effectively controlled, thereby making the optical element driving mechanism 100 and the optical element OE more stable.

According to some embodiments of the present disclosure, the size of the base protrusion 112*g* may be similar to the size of the movable part protrusion 123. For example, the transverse cross-sectional area of the base protrusion 112*g* may be similar to the transverse cross-sectional area of the movable part protrusion 123.

According to some embodiments of the present disclosure, the optical element first opening OEa may be larger than the optical element second opening OEb. For example, the size of the optical element second opening OEb may be similar to the size of the base protrusion 112*g*, and the size of the optical element first opening OEa may be larger than the size of the movable part protrusion 123.

In this way, the optical element OE may be effectively controlled, thereby making the optical element driving mechanism 100 and the optical element OE more stable.

According to some other embodiments of the present disclosure, the movable part protrusion 123 and the base protrusion 112*g* may extend into the same outer frame opening. For example, the outer frame opening may be large enough so that the outer frame opening may simultaneously accommodate the movable part protrusion 123 and the base protrusion 112*g*. In other words, the outer frame first opening 111*a* and the outer frame second opening 111*b* may be integrated into one opening of the outer frame.

In this way, the manufacture of the outer frame 111 may be simplified, thereby achieving the effect of reducing the cost, and may achieve the effect of weight reduction and miniaturization.

Figure 7:
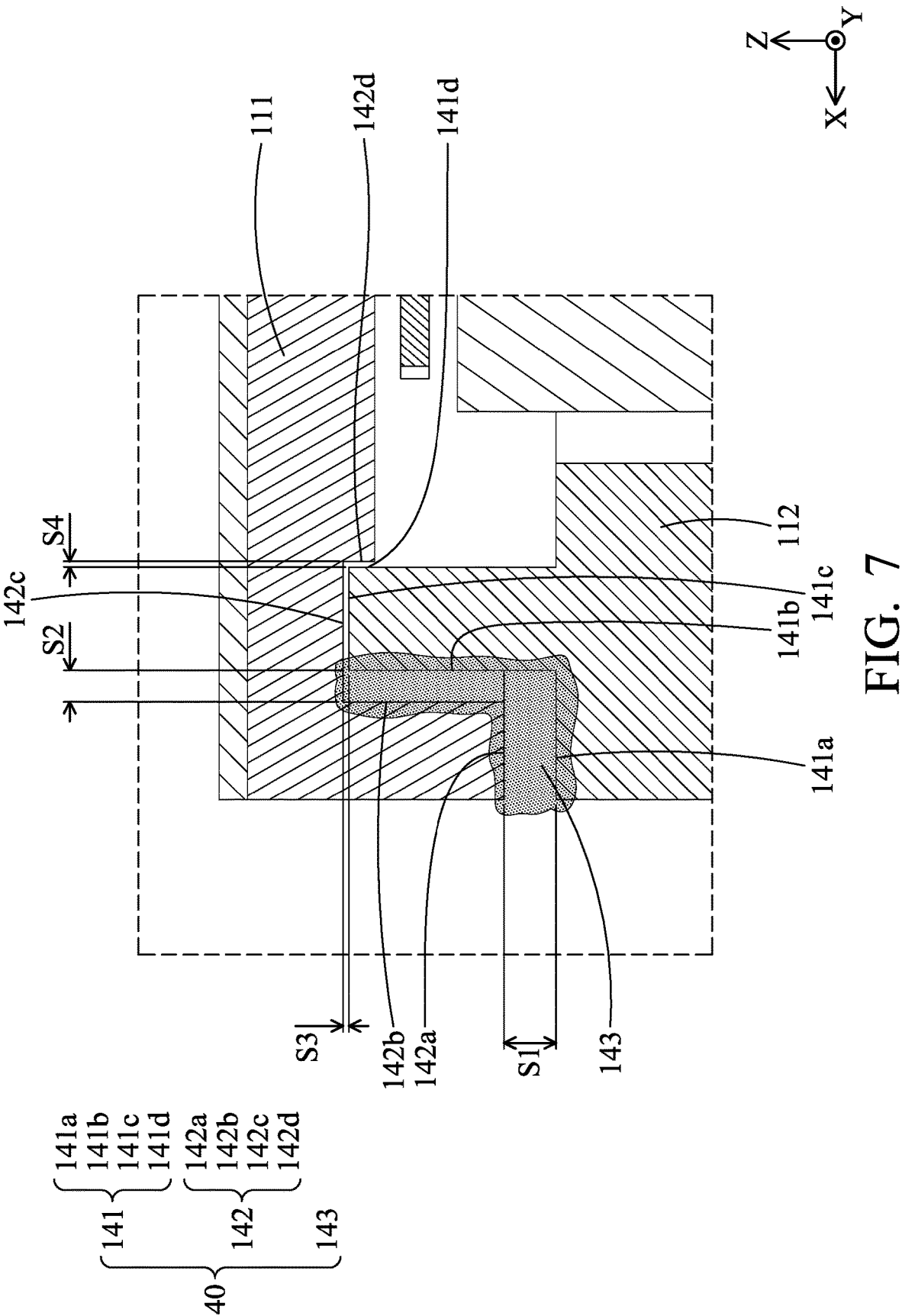
FIG. 7 is a partially enlarged view of FIG. 4.

Please refer to FIG. 7, FIG. 7 is a partially enlarged view of FIG. 4. As shown in FIG. 7, the connecting assembly 140 may include a first connecting element 141, a second connecting element 142, and an intermediate connecting element 143.

According to some embodiments of the present disclosure, the outer frame 111 may be fixedly connected to the base 112 via the connecting assembly 140. According to some embodiments of the present disclosure, the first connecting element 141 and the base 112 may have an integrally formed structure, and the second connecting element 142 and the outer frame 111 may have an integrally formed structure, and the outer frame 111 may have a plastic material.

In this way, the manufacture of the optical element driving mechanism 100 and the optical element OE may be simplified, thereby achieving the effect of cost reduction, and the effect of weight reduction and miniaturization may be achieved.

The first connecting element 141 may include a first connecting element first surface 141*a*, a first connecting element second surface 141*b*, a first connecting element third surface 141*c*, and a first connecting element fourth surface 141*d*.

The second connecting element 1142 may include a second connecting element first surface 142*a*, a second connecting element second surface 142*b*, a second connecting element third surface 142*c*, and a second connecting element fourth surface 142*d*.

The first connecting element first surface 141*a* and the second connecting element first surface 142*a* may face each other, and the first connecting element first surface 141*a* is not in contact with the second connecting element first surface 142*a*.

As shown in FIG. 7, the intermediate connecting element 143 may be disposed between the first connecting element first surface 141*a* and the second connecting element first surface 142*a*, so as to fix the first connecting element first surface 141*a* to the second connecting element first surface 142*a*.

The first connecting element second surface 141*b* may not be parallel to the first connecting element first surface 141*a*, and the second connecting element second surface 142*b* may not be parallel to the first connecting element second surface 141*b*. Moreover, the second connecting element second surface 142*b* and the first connecting element second surface 141*b* may face each other.

The intermediate connecting element 143 may be disposed between the first connecting element second surface 141*b* and the second connecting element second surface 142*b* to fix the first connecting element second surface 141*b* to the second connecting element second surface 142*b*.

In this way, the structure of the optical element driving mechanism 100 may be strengthened, thereby making the optical element driving mechanism 100 more stable.

Figure 8:
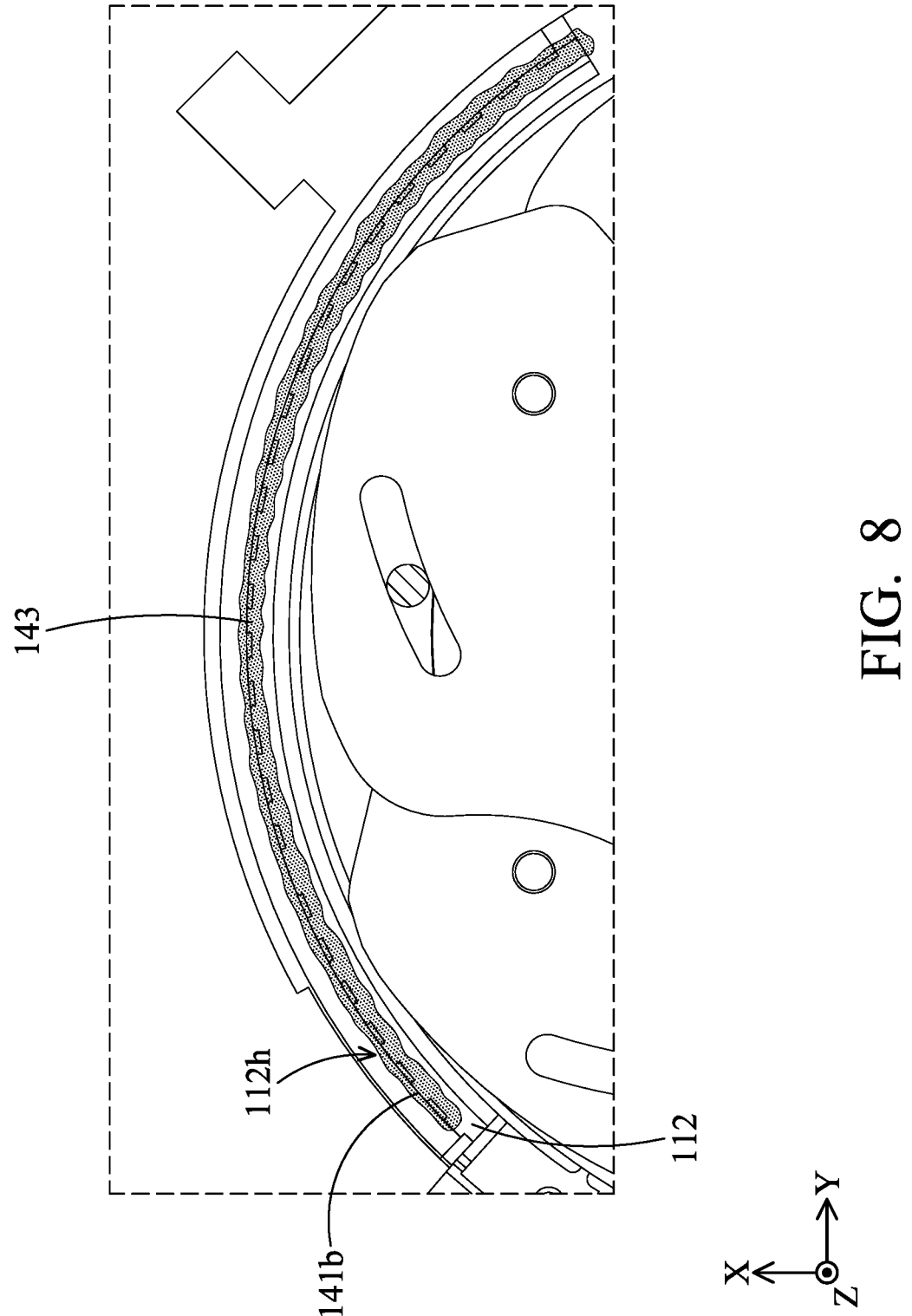
FIG. 8 is a cross-sectional view of the optical element driving mechanism and the optical element along the line D-D' in FIG. 2, according to some embodiments of the present disclosure.

Please refer to FIG. 8, FIG. 8 is a cross-sectional view of the optical element driving mechanism 100 and the optical element OE along the line D-D' in FIG. 2, according to some embodiments of the present disclosure.

As shown in FIG. 8, the base 112 may further include a connection reinforcing element 112*h*. The connection reinforcing element 112*h* may be disposed on the first connecting element second surface 141*b*, and the connection reinforcing element 112*h* may correspond to the intermediate connecting element 143.

According to some embodiments of the present disclosure, the connection reinforcing element 112*h* may have a plurality of grooves. In this way, the contact area of the intermediate connecting element 143 may be effectively increased to enhance the connection effect.

It should be noted that even though FIG. 8 only discloses one connection reinforcing element 112*h*, the optical element driving mechanism 100 of the present disclosure may include a plurality of connection reinforcing elements 112*h*, and each connection reinforcing element 112*h* may optionally be provided with an intermediate connecting element 143.

Please return to FIG. 7, the first connecting element third surface 141*c* may not be parallel to the first connecting element second surface 141*b*, and the second connecting element third surface 142*c* may not be parallel to the second connecting element second surface 142*b*. Moreover, the second connecting element third surface 142*c* and the first connecting element third surface 141*c* may face each other.

The first connecting element fourth surface 141*d* may not be parallel to the first connecting element third surface 141*c*, and the second connecting element fourth surface 142*d* may not be parallel to the second connecting element third surface 142*c*. Moreover, the second connecting element fourth surface 142*d* and the first connecting element fourth surface 141*d* may face each other.

According to some embodiments of the present disclosure, the first connecting element first surface 141*a*, the second connecting element first surface 142*a*, the first connecting element third surface 141*c*, and the second connecting element third surface 142*c* may be disposed parallel to each other or substantially parallel to each other.

According to some embodiments of the present disclosure, the first connecting element second surface 141b, the second connecting element second surface 142b, the first connecting element fourth surface 141d, and the second connecting element fourth surface 142d may be disposed parallel to each other or substantially parallel to each other.

According to some embodiments of the present disclosure, the first connecting element first surface 141a, the second connecting element first surface 142a, the first connecting element third surface 141c, and the second connecting element third surface 142c may be perpendicular or approximately perpendicular to the first connecting element second surface 141b, the second connecting element second surface 142b, the first connecting element fourth surface 141d, and the second connecting element fourth surface 142d.

In this way, the intermediate connecting element 143 may be effectively held between the first connecting element second surface 141b and the second connecting element second surface 142b, so as to enhance the connection effect.

According to some embodiments of the present disclosure, there may be a distance S1 between the first connecting element first surface 141a and the second connecting element first surface 142a.

According to some embodiments of the present disclosure, there may be a distance S2 between the first connecting element second surface 141b and the second connecting element second surface 142b.

According to some embodiments of the present disclosure, there may be a distance S3 between the first connecting element third surface 141c and the second connecting element third surface 142c.

According to some embodiments of the present disclosure, there may be a distance S4 between the first connecting element fourth surface 141d and the first connecting element fourth surface 142d.

According to some embodiments of the present disclosure, the distance S3 between the first connecting element third surface 141c and the second connecting element third surface 142c may be smaller than the distance S1 between the first connecting element first surface 141a and the second connecting element first surface 142a.

According to some embodiments of the present disclosure, the distance S3 between the first connecting element third surface 141c and the second connecting element third surface 142c may be smaller than the distance S2 between the first connecting element second surface 141b and the second connecting element second surface 142b.

According to some embodiments of the present disclosure, the distance S1 between the first connecting element first surface 141a and the second connecting element first surface 142a may be greater than the distance S2 between the first connecting element second surface 141b and the second connecting element second surface 142b.

According to some embodiments of the present disclosure, the distance S4 between the first connecting element fourth surface 141d and the first connecting element fourth surface 142d may be smaller than the distance S1 between the first connecting element first surface 141a and the second connecting element first surface 142a.

According to some embodiments of the present disclosure, the distance S4 between the first connecting element fourth surface 141d and the first connecting element fourth surface 142d may be smaller than the distance S2 between the first connecting element second surface 141b and the second connecting element second surface 142b.

In this way, the intermediate connecting element 143 may be effectively held between the first connecting element second surface 141b and the second connecting element second surface 142b, so as to enhance the connection effect.

According to some other embodiments of the present disclosure, there may be no gap between the first connecting element third surface 141c and the second connecting element third surface 142c (or S3=0).

According to some other embodiments of the present disclosure, there may be no distance between the first connecting element fourth surface 141d and the second connecting element fourth surface 142d (or S4=0).

In this way, the intermediate connecting element 143 may be effectively held between the first connecting element second surface 141b and the second connecting element second surface 142b, so as to prevent the intermediate connecting element 143 from overflowing to an undesired position.

In general, the optical element driving mechanism of the disclosed embodiment may have the effects of miniaturization, weight reduction, improvement of stability, simplification of manufacture and reduction of cost, so that the user may operate the optical element driving mechanism smoothly, and may obtain better imaging effect.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
   a movable part, connected to an optical element;
   a fixed part, wherein the movable part is movable relative to the fixed part, the fixed part comprises an outer frame and a base, and the base comprises a connection reinforcing element;
   a driving assembly, driving the movable part to move relative to the fixed part; and
   a connecting assembly, wherein the outer frame is fixedly connected to the base via the connecting assembly, wherein the connecting assembly comprises:
   a first connecting element, wherein the first connecting element and the base have an integrally formed structure, the first connecting element comprises a first connecting element first surface and a first connecting element second surface, and wherein the first connecting element second surface is not parallel to the first connecting element first surface;

a second connecting element, wherein the second connecting element and the outer frame have an integrally formed structure, the second connecting element comprises a second connecting element first surface and a second connecting element second surface, the second connecting element first surface faces the first connecting element first surface, the second connecting element second surface is not parallel to the second connecting element first surface, and the second connecting element second surface faces the first connecting element second surface; and an intermediate connecting element, disposed between the first connecting element first surface, the second connecting element first surface, the first connecting element second surface, and the second connecting element second surface, wherein the connection reinforcing element is disposed on the first connecting element second surface and has a plurality of grooves, and the connection reinforcing element corresponds to the intermediate connecting element, wherein the first connecting element first surface is not in contact with the second connecting element first surface, and wherein the outer frame is made of plastic material.

2. The optical element driving mechanism as claimed in claim 1, wherein the first connecting element further comprises a first connecting element third surface, the first connecting element third surface is not parallel to the first connecting element second surface, wherein the second connecting element further comprises a second connecting element third surface, the second connecting element third surface is not parallel to the second connecting element second surface, and the second connecting element third surface faces the first connecting element third surface, wherein a distance between the first connecting element third surface and the second connecting element third surface is smaller than a distance between the first connecting element first surface and the second connecting element first surface, wherein the distance between the first connecting element third surface and the second connecting element third surface is smaller than a distance between the first connecting element second surface and the second connecting element second surface, and wherein the distance between the first connecting element first surface and the second connecting element first surface is larger than the distance between the first connecting element second surface and the second connecting element second surface.

3. The optical element driving mechanism as claimed in claim 2, wherein the first connecting element further comprises a first connecting element fourth surface, the first connecting element fourth surface is not parallel to the first connecting element third surface, wherein the second connecting element further comprises a second connecting element fourth surface, the second connecting element fourth surface is not parallel to the second connecting element third surface, and the second connecting element fourth surface faces the first connecting element fourth surface, wherein a distance between the first connecting element fourth surface and the second connecting element fourth surface is smaller than the distance between the first connecting element first surface and the second connecting element first surface, and wherein the distance between the first connecting element fourth surface and the second connecting element fourth surface is smaller than the distance between the first connecting element second surface and the second connecting element second surface.

4. The optical element driving mechanism as claimed in claim 1, further comprising a light shielding assembly, comprising:

a first light shielding element, comprising a first light shielding element opening, wherein the first light shielding element opening corresponds to a light; and a second light shielding element, comprising a second light shielding element opening, wherein the second light shielding element opening corresponds to the light, and the second light shielding element opening is smaller than the first light shielding element opening, wherein the first light shielding element opening is closer to a light incident end than the second light shielding element opening.

5. The optical element driving mechanism as claimed in claim 4, wherein the first light shielding element is disposed on the outer frame, and the second light shielding element is disposed on the base, wherein a first adhesive element is disposed between the first light shielding element and the outer frame, wherein a second adhesive element is disposed between the second light shielding element and the base, and wherein the Young's modulus of the first adhesive element is smaller than the Young's modulus of the second adhesive element.

6. The optical element driving mechanism as claimed in claim 4, wherein the movable part comprises:

an movable part main body; and a movable part protrusion, extending from the movable part main body towards the first light shielding element, wherein the movable part protrusion pass through the optical element, wherein the movable part protrusion at least partially overlaps the outer frame when viewed along a direction that is perpendicular to an optical axis, and wherein the movable part protrusion is not in contact with the outer frame.

7. The optical element driving mechanism as claimed in claim 6, wherein the second light shielding element at least partially overlaps with the movable part main body when viewed along the direction that is perpendicular to the optical axis.

8. The optical element driving mechanism as claimed in claim 6, wherein the optical element comprises an optical element first opening, and the movable part protrusion passes through the optical element first opening.

9. The optical element driving mechanism as claimed in claim 8, wherein the base comprises:

a base main body; and a base protrusion, extending from the base main body towards the first light shielding element, wherein the base protrusion passes through the second light shielding element and the optical element, wherein the base protrusion at least partially overlaps the outer frame when viewed along a direction that is perpendicular to an optical axis, and wherein the base protrusion is not in contact with the outer frame.

10. The optical element driving mechanism as claimed in claim 9, wherein the optical element further comprises an optical element second opening, and the base protrusion passes through the optical element second opening, wherein the optical element first opening is larger than the optical element second opening, and wherein the outer frame comprises an outer frame opening, and the movable part protrusion and the base protrusion extend into the outer frame opening.

11. The optical element driving mechanism as claimed in claim 4, wherein there is a gap between the second light shielding element and the optical element.

12. The optical element driving mechanism as claimed in claim 4, wherein the outer frame has an outer frame cutting edge, and the first light shielding element has a first light shielding element cutting edge, and wherein the first light shielding element cutting edge is aligned with the outer frame cutting edge when viewed along an optical axis.

13. The optical element driving mechanism as claimed in claim 1, further comprising a stopping assembly, comprising:

a base first stopping element; and a movable part first stopping element, facing the base first stopping element, wherein the movable part first stopping element is contactable with the base first stopping element to limit a distance that the movable part moves close to or away from the center of the optical element driving mechanism.

14. The optical element driving mechanism as claimed in claim 13, wherein the stopping assembly further comprises:

a base second stopping element; and a movable part second stopping element, facing the base second stopping element, wherein the movable part second stopping element is contactable with the base second stopping element, so as to limit the distance that the movable part moves close to or away from the center of the optical element driving mechanism.

15. The optical element driving mechanism as claimed in claim 1, wherein the base comprises:

a base third bottom wall, facing the movable part, wherein the movable part comprises:

a movable part main body; and a movable part supporting foot, extends from the movable part main body toward the base third bottom wall, wherein the movable part supporting foot abuts against the base third bottom wall.

16. An optical element driving mechanism, comprising:

a movable part, connected to an optical element;

a fixed part, wherein the movable part is movable relative to the fixed part; and a driving assembly, driving the movable part to move relative to the fixed part;

wherein the fixed part comprises an outer frame and a base, and the base comprises:

a base first bottom wall;

a base second bottom wall;

a base first side wall, connected to the base first bottom wall and extending away from the base first bottom wall; and a base second side wall, facing the base first side wall, connected to the base second bottom wall, and extending away from the base second bottom wall, wherein the base first side wall and the base second side wall are not parallel to each other.

17. The optical element driving mechanism as claimed in claim 16, wherein the base first bottom wall is not perpendicular to the base first side wall, and the base second bottom wall is not perpendicular to the base second side wall, and wherein the base first bottom wall and the base second bottom wall are not parallel to an optical axis.

18. The optical element driving mechanism as claimed in claim 16, wherein the angle between the base first bottom wall and the base first side wall is greater than 90 degrees, and the angle between the base second bottom wall and the base second side wall is greater than 90 degrees.

* * * * *